United States Patent [19]
van Laak et al.

[11] Patent Number: 5,656,686
[45] Date of Patent: Aug. 12, 1997

[54] POLYETHYLENE MOLDING COMPOSITIONS

[75] Inventors: Hermann van Laak, Hunxe; Josef Berzen, Oberhausen; Jens Ehlers, Hamminkeln; Meinhard Gusik, Oberhausen, all of Germany

[73] Assignee: Hoechst Aktiengesellschaft, Germany

[21] Appl. No.: 496,137

[22] Filed: Jun. 28, 1995

[30] Foreign Application Priority Data

Jun. 28, 1994 [DE] Germany .................. 44 22 582.2
Apr. 15, 1995 [DE] Germany .................. 195 14 262.4

[51] Int. Cl.$^6$ ................................ C08K 3/04
[52] U.S. Cl. .............. 524/495; 252/511; 524/496; 525/191; 525/240
[58] Field of Search ............ 252/511; 524/495, 524/496; 525/191, 240

[56] References Cited

U.S. PATENT DOCUMENTS

| 4,287,117 | 9/1981 | Theysohn et al. ............ 260/42.46 |
| 4,933,383 | 6/1990 | Toyota et al. ................ 525/240 |

FOREIGN PATENT DOCUMENTS

| 0057891 | 8/1982 | European Pat. Off. . |
| 0330168 | 8/1989 | European Pat. Off. . |
| 1494230 | 2/1969 | Germany . |

OTHER PUBLICATIONS

GB, AN–88–095557, Mitsubishi Feb. 1988 (Derwent).

Copy of Derwent Publications Ltd. London, GB, AN–88–095557 & JP–A–63 046 (Mitsubishi Belting), Feb. 27, 1988.

*Primary Examiner*—Edward J. Cain
*Attorney, Agent, or Firm*—Bierman, Muserlian and Lucas, LLP

[57] ABSTRACT

Polyethylene compositions for producing moldings have a surface resistance of at most $10^9 \Omega$ including a) 0.1% to 80% of a polyethylene or an ethylene copolymer having an intrinsic viscosity of from 100 to 700 ml/g;

b) 99.9% to 20% of a polyethylene having an intrinsic viscosity of at least 1600 ml/g;

c) 1.0% to 10.0, based on the polymer mixture of a and b, of carbon black; and wherein the sum of Components a and b is 100% and the intrinsic viscosity of the polymer mixture of a and b is at least 1600 ml/g.

11 Claims, No Drawings

POLYETHYLENE MOLDING COMPOSITIONS

This Application claims the benefit of the priority of German Applications P 44 22 582.2 and 195 14 262.4, filed Jun. 28, 1994 and Apr. 15, 1995, respectively.

The Invention relates to antistatically treated polyethylene (PE) which is particularly suitable for processing by injection molding.

BACKGROUND OF THE INVENTION

Owing to its poor electrical conductivity, polyethylene, like other polymeric materials, becomes electrostatically charged. This property stands in the way of its use in various technical fields and has led to the development of materials which are antistatic, i.e. possess at least a low electric conductivity. Solid materials which are classified as antistatic are those having a surface resistance of at most $10^9 \Omega$.

Numerous measures are known for preventing the electrostatic charging of polyolefins. The conductivity can be achieved, as early as in the synthesis, by chemical modification of the plastic itself by influencing its molecular structure. Subsequently, it can be obtained, for example, by oxidation of the surface or addition of electrically conductive fillers (antistatic agents). Suitable antistatic agents are ionogenic organic compounds of differing constitution having a high boiling point, which compounds are sufficiently compatible with the polyolefin, i.e. do not tend to sweat out. These include substances containing hydroxyl, amino, or amide groups. For certain applications, metal fibers, platelets, or powders can also be used as antistatic fillers.

The classical antistatic agent is carbon black which, above a minimum concentration of between 5% and 10%, produces electrical conductivity in a wide variety of plastics. To effectively make polyethylenes having viscometrically determined mean molecular weights up to about 500,000 g/liter antistatic, a uniformly distributed carbon black content of from 10% to 20% by weight is required. The disadvantage is that, at such relatively high concentrations, valuable properties of the polyethylene, e.g. its toughness and wear resistance, are adversely affected.

One possible way of avoiding the loss in quality associated therewith is to distribute the filler non-randomly in the specified polyethylene. Such a distribution is achieved by use of conductive filler particles having a substantially smaller diameter than the diameter of the primary particles of the plastic. Mixtures of this composition are then pressed at temperatures at which complete melting of the plastic does not occur; this prevents the electrically conductive filler from migrating into the polymer particle. The result is the formation of a core-shell structure which, compared to the homogeneous distribution of carbon black, gives the same electric conductivity at significantly lower carbon black content. To obtain the core-shell structure at least partially, the particles must not be completely melted and, for this reason, the structure can only be obtained by pressing.

A proven process which gives polyethylenes of the ultra high molecular weight (UHMWPE) type is the subject matter of DE-C-2 361 508. It is carried out at pressures of 0.1 to 10 MPa and temperatures of 30° to 130° C. using catalysts comprising titanium (III) halides and organic aluminum compounds. Other processes are also suitable, e.g. ethylene polymerization in the presence of chromium oxide catalysts which likewise proceeds at low pressures.

UHMWPE has a group of physical properties which makes it suitable for a wide variety of applications. Particular mention should be made of its high wear resistance, its low coefficient of friction with other materials, and its excellent toughness. In addition, it is remarkably resistant to numerous chemicals.

Owing to this favorable tribological and chemical behavior, UHMWPE is used in a wide variety of technical fields as a multi-faceted material. Examples are the textile industry, machine construction and the chemical industry. However, there is the disadvantage that UHMWPE, owing to its extremely low flowability even above the crystallite melting point, can be processed into shaped articles only with difficulty using methods customary for thermoplastics. Thus, for example, processing of UHMWPE on plastic-processing machines suitable for low molecular weight polyethylene (LMWPE) does not enable production of moldings in which the excellent mechanical properties of the starting material remain unaltered.

SUMMARY OF THE INVENTION

It is, therefore, the object of the Invention to provide polyethylene molding compositions which, despite antistatic treatment with carbon black, have high toughness and wear resistance and can be processed by thermal methods, e.g. pressing, extruding, or injection molding.

Surprisingly, it has been found that moldings produced from LMWPE/UHMWPE mixtures require, to achieve the same surface resistance, a significantly smaller amount of carbon black than the sum of the carbon black contents required by each of the components, of the mixture alone. Thus, for example, the addition of 20% by weight of UHMWPE to LMWPE reduces the amount of carbon black required to achieve a surface resistance of $10^9 \Omega$ to about one third based on LMWPE and about one half based on the mixture.

The low carbon black requirement to achieve a particular conductivity for the polyethylene molding compositions of the Invention can be explained by formation of a core-shell structure. Such structure, in contrast to the known core-shell structure (cf., for example K.-H. Möbius, Kunststoffe 78 (1988), pages 53, 55), is not achieved by a particular thermal treatment of the mixture of primary particles of the plastic and filler particles, but rather by including components which behave differently on heating. In this context, the thermal behavior of LMWPE and UHMWPE is significant. On heating, LMWPE changes above the crystallite melting point into a melt in which additives can be dissolved or insoluble fillers such as carbon black can be homogeneously distributed.

In contrast, UHMWPE is, owing to its viscoelastic behavior, shape stable even at high temperatures. Even above the crystallite melting point (and below the decomposition temperature), the polyethylene particles are retained. Fillers are therefore incorporated only between the UHMWPE particles, i.e. at the grain boundaries, but not in the grain itself. It is to be assumed that, on heating a carbon black-containing mixture of LMWPE and UHMWPE, the carbon black particles are homogeneously distributed in the melt of the low molecular weight polyethylene. At the same time, the non-melting particles of the ultra high molecular weight polyethylene, which transform into a viscoelastic state, are merely surrounded by a layer of conductive carbon black, so that there results a core-shell structure in which the cores are formed of UHMWPE particles distributed in the LMWPE melt. It is to be emphasized that the core-shell structure of LMWPE/UHMWPE mixture is retained over the whole thermal and mechanical processing range customary for polyethylenes, i.e. for example, also at high temperatures (about 300° C.) and/or high shear as occurs in injection molding.

It is particularly notable that the mechanical properties of molding compositions containing a proportion of LMWPE are excellent, despite the addition of carbon black. The mixing in of UHMWPE improves, in particular, toughness and wear in comparison with molding compositions of LMWPE alone. On the other hand, the processability by thermal methods, e.g. by injection molding, does not suffer as a result of the UHMWPE content.

Molding compositions containing predominantly UHMWPE (based on the polymer mixture of the components a and b) have a particularly high level of toughness and wear resistance. The mixing in of LMWPE increases the flowability and assists in plasticizing the molding compositions in comparison with unmixed UHMWPE with the result that the processability—for example by injection molding or extrusion—is improved.

The foregoing improvements are achieved by polyethylene compositions for producing moldings having a surface resistance not exceeding $10^9 \Omega$. All percentages in the specification and claims hereof are by weight. The molding compositions comprise a) 0.1% to 80% of a polyethylene or an ethylene copolymer, the polyethylene or copolymer having an intrinsic viscosity of from 100 to 700 ml/g;

b) 99.9% to 20% of a polyethylene having an intrinsic viscosity of at least 1600 ml/g, wherein components a and b form a polymer mixture and total 100%, and the intrinsic viscosity of said polymer mixture is at least 1600 ml/g; and c) 1.0% to 10.0%, based on said polymer mixture, of carbon black.

The composition may also contain 0.05% to 5.0%, based on the polymer mixture plus c, of the usual additives.

DETAILED DESCRIPTION OF THE INVENTION

The polymeric constituents of the new polyethylene molding compositions are characterized by their respective intrinsic viscosities [η] (also known as Staudinger Indicies). This parameter is determined from the solution viscosity η (experimentally determined in decalin at 135° C. cf DIN 53 728, sheet 4) according to the Martin equation.

$$\log \eta = \log [\eta] + [\eta] \cdot c$$

K is a dimensionless number and has the value of 0.139. c is dependent on the intrinsic viscosity and is 0.03 g/dl for PE grades having an intrinsic viscosity of from 1600 to 5000 ml/g and 0.1 g/dl for polyethylene grades having an intrinsic viscosity of 100 to 700 ml/g.

The intrinsic viscosities as an indication of the melt viscosity are a measure of the mean molecular weight of the polymers. The intrinsic viscosity range from 100 to 700 ml/g is, according to L. H. Henry, J. Polymer Sci., 36, 3 (1959), a characteristic of LMWPE having a molecular weight of about 50,000 to about 500,000. LMWPE meeting the specified requirements is obtained, for example, by a procedure described in DE-C-2 837 481. Here, separately prepared Ti (III) halides and organic aluminum compounds are used as catalysts and the molecular weight of the polymer is regulated using oxygen and, if appropriate, hydrogen. The reaction proceeds at from 20° to 250° C. and from 0.1 to 10 MPa.

Intrinsic viscosities of at least 1600 ml/g describe, according to Margolies (CZ-Chemie-Technik 1974, p. 129 ff), UHMWPE according to the Invention having a mean weight average molecular weight of at least about $3.3 \times 10^6$.

The LMWPE component a is used in the polyethylene molding composition in an amount of 0.1% to 80%, preferably 1% to 80% and, in particular, 5% to 57%. The UHMWPE component b is present in an amount of 99.9% to 20%, preferably 99% to 20% and, in particular, 95% to 43%. The sum of the LMWPE component a and the UHMWPE component b is 100%. The intrinsic viscosity of the LMWPE is 100 to 700 ml/g and preferably 120 to 500 ml/g; the intrinsic viscosity of the UHMWPE is at least 1600 ml/g and preferably 1900–6000 ml/g. The intrinsic viscosity of the polymer mixture of the LMWPE component a and the UHMWPE component b is at least 1600 ml/g and preferably at least 1900 ml/g.

Mixtures comprising from 0.1% to 40% of LMWPE and from 99.9% to 60% of UHMWPE can be processed by pressing, injection molding, or screw extrusion to give moldings which possess a high resistance to hydroabrasive and sliding wear. Mixtures having a high proportion of UHMWPE are preferably processed by pressing.

Molding compositions containing more than 40% and at most 57% of LMWPE and less than 60% and at least 43% of UHMWPE are suitable, in particular, for producing injection molded parts which are subjected to sliding wear against sliding partners having polished or rough surfaces.

In place of LMWPE, it is also possible to use, in all mixtures, copolymers having intrinsic viscosities of from 100 to 700 ml/g comprising ethylene as the main component and straight or branched chain α-olefins, such as propylene, 1-butene, 1-pentene, 1-hexene, and 4-methylpentene. The proportion of comonomer in these polymers is up to 10% by weight, in particular from 0.5% to 5%. Accordingly, the abbreviated designation LMWPE also includes such copolymers.

To lower the surface resistance to values of at most $10^9 \Omega$, the polymer mixture of the Components a and b has carbon black (Component c) added to it in amounts of from 1.0 to 10%, preferably 1.0–8.0% (based on the total polymer mixture of a and b). The amount of carbon black to be used in the individual case depends on the type of carbon black and on the proportion of polyethylene or ethylene copolymer having an intrinsic viscosity in the range from 100 to 700 ml/g in the molding composition.

A wide variety of types of carbon black are suitable for the compositions of the Invention, regardless of whether they were obtained by incomplete combustion of natural gas, petroleum, or coal tar products, or by thermal cracking of natural gas or lower hydrocarbons.

The electric conductivity of carbon black is determined by a number of parameters, among which particle size, external and internal surface area (porosity), structure, and surface chemistry are of particular importance. There is a functional relationship between particle size, surface area, and structure of carbon black which is measured by oil absorption (in accordance with DIN ISO 787/5) in g of oil/100 grams of carbon black. With decreasing particle size, increasing surface area and structure of the carbon black, the oil absorption and the achievable electrical conductivity increase. Carbon blacks having an oil absorption of 600 to 2000 g/100 g have been found to be useful. The structure of carbon black is determined according to DIN 53601 or ASTM D 2414 by the absorption of dibutyl phthalate (DBP) in ml of DBP/100 g of carbon black. Highly-structured carbon blacks, i.e. having DBP values>115 ml/100 g are described as conductive or high-conductivity blacks; they are preferred as constituents of the molding compositions of the Invention. Carbon blacks having DBP values between 120 and 500 ml/100 g are particularly suitable.

The surface resistance of moldings produced from the molding compositions of the Invention is measured in accordance with DIN VDE 0303, part 30. In the case of surface resistances $\leq 10^9 \Omega$, electrostatic charging processes no longer occur.

The polyethylene compositions of the Invention are produced by homogeneously mixing the pulverulent starting materials in a suitable mixer. The homogeneous mixture can subsequently be densified in an extruder with melting of the LMWPE component. According to another process, LMWPE and UHMWPE are mixed and homogenized in a twin-screw extruder. This procedure enables the composition to be converted into granule form.

To the polymer mixture there may be added 0.05% to 5%, preferably 0.1% to 2.5%, based on the mixture of Components a, b, and c, of customary additives. These include processing aids and stabilizers, such as corrosion inhibitors, light stabilizers, and heat stabilizers. Furthermore, pigments and/or fillers can also be included. Suitable fillers are, for example, inorganic materials, such as silica in its various natural or industrially produced forms, natural or synthetic aluminum or magnesium silicates, zeolites, calcium carbonate, and barium sulfate. Fillers can also include spheres, e.g. of glass, and fibers, e.g. of glass, carbon, boron, polyester, or polyamide. Finally, lubricants and release agents, such as zinc stearate, can also be added to the molding compositions.

The novel molding compositions can be processed on conventional injection-molding machines in one or more stages. It is not necessary to adhere to particular conditions. However, for conventional injection molding of compositions containing predominantly UHMWPE, it has been found desirable to use composition temperatures of 240° to 310° C. and injection pressures of 100 to 400 MPa. The molding compositions of the Invention are well suited for the production of moldings of any desired shape, especially antistatic sliding elements.

In the following examples, the novel polyethylene molding compositions are described in more detail. Of course, the Invention is not restricted to the embodiments presented.

1. Characteristics of the constituents of the molding compositions

A. LMWPE

Intrinsic viscosity: 206 [ml/g]

Notched impact toughness

U notch: 4 [mJ/mm$^2$]

15° double-point notch: about 10 [mJ/mm$^2$]

Relative hydroabrasive wear: 594

B. UHMWPE

Intrinsic viscosity: 2,880 [ml/g]

Notched impact toughness

U notch: no fracture

15° double-point notch: from about 130 to 150

Relative hydroabrasive wear: 70

The notched impact toughness is measured in accordance with ISO 179 (1993), the determination of the hydroabrasive wear (sand slurry test) is described in CZ-Chemie Technik 3, 129, 130 (1974) and is here compared with a UHMWPE grade whose intrinsic viscosity is 1900 ml/g.

C. Carbon black

DBP absorption: 120 ml/100 g

Oil absorption: 650 g/100 g

2. Properties of the molding compositions

The molding compositions are produced by homogeneously mixing LMWPE, UHMWPE and carbon black in the specified amounts in a mixer, and are subsequently processed on an injection molding machine (DEMAG D 175) at a composition temperature of 260° C., a tool temperature of 60° C., and an injection time of 1.8 sec to give moldings having a weight of 180 g and a wall thickness of about 10 mm.

A. Conductivity behavior

Molding compositions containing differing amounts of the components described in Paragraph 1 are prepared and processed by injection molding. By measurement of the surface resistance of the moldings so produced, the amount of carbon black in the molding compositions required to achieve a surface resistance $\leq 10^9 \Omega$ is determined. The results are shown in Table 1.

TABLE 1

| LMWPE Component a (% by weight) | UHMWPE Component b (% by weight) | carbon black content required (% by weight, based on 100% by weight of the polymer mixture of a and b) |
|---|---|---|
| >50 | <50 | about 7.5 |
| 50 to 20 | 50 to 80 | about 2.5 |
| <20 | >80 | about 1.0 |

(Sum Of components a and b = 100% by weight)

For the same material composition, the conductivity of the moldings is dependent on the method selected for their processing.

B. Mechanical properties

Molding compositions containing differing amounts of the components described in Paragraph 1 are prepared and processed by injection molding or pressing. The results are shown in Table 2.

TABLE 2

| Constituents of the molding composition | Makeup of the molding composition | | | |
|---|---|---|---|---|
| LMWPE | 80 | 50 | 20 | [% by weight based on polymer mixture] |
| UHMWPE | 20 | 50 | 80 | [% by weight based on polymer mixture] |
| Carbon black | 7.5 | 2.5 | 1.0 | [% by weight based on 100% by weight of the polymer mixture of a and b] |
| Processing by Injection molding Surface resistance | 6 | 5 | 12 | [$10^6 \Omega$] |
| Pressing Surface resistance | 17 | 100 | ~300 | [$10^6 \Omega$] |
| Notched impact toughness (15° double-point notch)] | 11 | 21 | 138 | [mJ/mm$^2$] |
| relative hydroabrasive wear | 471 | 417 | 112 | |

While only a limited number of specific embodiments of the present invention have been expressly disclosed, it is nonetheless, to be broadly construed, and not to be limited except by the character of the claims appended hereto.

What is claimed is:

1. A polyethylene composition for producing moldings having a surface resistance not exceeding $10^9 \Omega$ comprising
   a) 5 to 57% of a LMWPE polyethylene or an ethylene copolymer, said polyethylene or copolymer having an intrinsic viscosity of 100 to 700 ml/g;
   b) 95% to 43% of an UHMWPE polyethylene having an intrinsic viscosity of at least 1600 ml/g; and c) 2.5 to 8%, based on said polymer mixture, of carbon black;

wherein a and b total 100% and comprise a polymer mixture which has an intrinsic viscosity of at least 1600 ml/g.

2. The composition of claim 1 wherein a is a copolymer and has a comonomer content of up to 10%.

3. The composition of claim 2 wherein said comonomer content is 0.5% to 5%.

4. The composition of claim 1 comprising up to 50%, based on said polymer mixture, of said polyethylene or said copolymer, said composition containing to 2.5% to 8% of carbon black.

5. The composition of claim 1 wherein said carbon black has an oil absorption value of 600 to 2000 g/100 g.

6. The composition of claim 1 wherein said carbon black has a dibutyl phthalate absorption value of more than 115 ml/100 g.

7. The composition of claim 6 wherein said carbon black has a dibutyl phthalate absorption value of 120 to 500 ml/100 g.

8. The composition of claim 1 wherein a has an intrinsic viscosity of 120 to 500 ml/g.

9. The composition of claim 1 wherein b has an intrinsic viscosity of at least 1900 ml/g.

10. The composition of claim 1 containing 40% to 57% of a and 43% to 60% of b.

11. The composition of claim 1 further comprising 0.05% to 5.0%, based on said polymer mixture and c), of at least one additive selected from the group consisting of processing aids, stabilizers, corrosion inhibitors, light stabilizers, heat stabilizers, pigments, fillers, lubricants and release agents.

* * * * *